(12) United States Patent
Qiang et al.

(10) Patent No.: US 11,299,400 B2
(45) Date of Patent: Apr. 12, 2022

(54) HIERARCHICAL POROUS $ZrO_2$ MATERIAL, METHOD OF PREPARING THE SAME, AND APPLICATION THEREOF

(71) Applicants: Taotao Qiang, Xi'an (CN); Lei Tian, Xi'an (CN); Runtong Zhu, Xi'an (CN); Lu Chen, Xi'an (CN)

(72) Inventors: Taotao Qiang, Xi'an (CN); Lei Tian, Xi'an (CN); Runtong Zhu, Xi'an (CN); Lu Chen, Xi'an (CN)

(73) Assignee: SHAANXI UNIVERSITY OF SCIENCE AND TECHNOLOGY, Xi'an (CN)

( * ) Notice: Subject to any disclaimer, the term of this patent is extended or adjusted under 35 U.S.C. 154(b) by 211 days.

(21) Appl. No.: 16/826,032

(22) Filed: Mar. 20, 2020

(65) Prior Publication Data

US 2020/0325035 A1 Oct. 15, 2020

(30) Foreign Application Priority Data

Apr. 15, 2019 (CN) .......................... 201910297201.5

(51) Int. Cl.
    *C01G 25/02* (2006.01)

(52) U.S. Cl.
    CPC .......... *C01G 25/02* (2013.01); *C01P 2006/12* (2013.01); *C01P 2006/16* (2013.01)

(58) Field of Classification Search
    CPC ..................................................... C01G 25/02
    See application file for complete search history.

(56) References Cited

U.S. PATENT DOCUMENTS

2011/0318249 A1\* 12/2011 Nakayama .............. C01B 37/00
423/325

\* cited by examiner

*Primary Examiner* — James A Fiorito

(57) ABSTRACT

A method for preparing a hierarchical porous $ZrO_2$ includes the following steps: S1, dissolving a triblock copolymer in an organic solvent to obtain a solution A, dissolving a tannin extract in distilled water to obtain a solution B, mixing the solution A and the solution B and stirring to obtain a mixed solution; S2, adding a zirconium salt to the mixed solution obtained in step S1 and stirring; S3, heating the mixed solution obtained in step S2 in an oven to obtain $ZrO_2$, promoting the conversion of the crystal form of $ZrO_2$; S4, calcining $ZrO_2$ at a high temperature to obtain the hierarchical porous $ZrO_2$.

7 Claims, 5 Drawing Sheets

HIERARCHICAL POROUS ZRO₂ MATERIAL, METHOD OF PREPARING THE SAME, AND APPLICATION THEREOF

The present invention claims priority to Chinese Patent Application No.: 201910297201.5, field on Apr. 15, 2019, which is incorporated by reference for all purposes as if fully set forth herein.

FIELD OF THE INVENTION

The invention relates to the technical field of metal oxide solid materials, in particular, to a hierarchical porous $ZrO_2$ material, a method of preparing the same, and an application thereof.

BACKGROUND OF THE INVENTION

Porous solid material has a unique pore structure. It can not only interact with atoms, ions and molecules on its surface, but also realize material transport in the pore structure inside the material. It has been widely used in in ion exchange, adsorption and catalysis, etc. In practical applications, single pore (microporous, mesoporous or macroporous) materials have certain limitations. For example, the pore size of the microporous material is too small, and it cannot be used for the transport of the material. The pore wall of the mesoporous material is an amorphous structure. The pore structure of macroporous materials has poor thermal stability and is easily breakable. Hierarchical (multiple stage) pours solid materials have two or more pore structures. Compared with traditional porous solid materials, hierarchical porous materials are combined with several single pore structures and thus have characteristics of pore structures at various levels, such as higher permeability, larger specific surface area, making it suitable for separation, catalysis, thermal insulation, energy storage and other fields.

As a P-type semiconductor, zirconium dioxide ($ZrO_2$) generates oxygen holes and has good adsorption. In addition, $ZrO_2$ not only has the characteristics of general transition metal oxides, but also is a metal oxide with oxidative, reducing and acid-base surface centers. It has unique physical and chemical properties, such as high melting point, hardness and chemical stability, good wear resistance and corrosion resistance, high biocompatibility, widely used as heterogeneous catalysts, catalyst carriers, adsorbents, chemical sensors, solid oxide fuel cells, electronic materials, etc.

At present, the preparation method of hierarchical pours $ZrO_2$ uses a lot of raw materials and generates heavy pollution. For example, common metal organic alkoxides are used as metal sources, and severe experimental conditions (high temperature or high pressure) are required. The synthesis steps are complicated. There is a need to develop a mild, simple, and green method to prepare hierarchical pours $ZrO_2$ in large industrial scale.

SUMMARY OF THE INVENTION

In one embodiment, a method for preparing a hierarchical porous $ZrO_2$ includes the following steps: S1, dissolving a triblock copolymer in an organic solvent to obtain a solution A, dissolving a tannin extract in distilled water to obtain a solution B, mixing the solution A and the solution B and stirring to obtain a mixed solution; S2, adding a zirconium salt to the mixed solution obtained in step S1 and stirring; S3, heating the mixed solution obtained in step S2 in an oven to obtain $ZrO_2$, promoting the conversion of the crystal form of $ZrO_2$; and S4, calcining $ZrO_2$ at a high temperature to obtain the hierarchical porous $ZrO_2$.

In another embodiment, the triblock copolymer is Pluronic P123, Pluronic F127 or Pluronic F108.

In another embodiment, the tannin extract is a sulfonated *Acacia mangim* tannin extract.

In another embodiment, the zirconium salt is zirconium chloride, zirconium sulfate, zirconium nitrate, zirconium phosphate, or zirconium oxalate.

In another embodiment, the organic solvent is methanol, ethanol, ethylene glycol, or glycerin.

In another embodiment, a molar ratio of the triblock copolymer:the tannin extract:the zirconium salt is 0.015-0.05:0.01-0.05:0.1-1.0.

In another embodiment, in step S2, the mixed solution is stirred for 3-6 hours; in step 3, the mixed solution is heated at 40° C. for 24-96 hours; and in step S4, $ZrO_2$ is calcined at 200-250° C. for 60-120 minutes and then at 550-700° C. for 240-360 minutes.

In another embodiment, a hierarchical porous $ZrO_2$ is prepared in accordance with the method of the present invention. The hierarchical porous $ZrO_2$ has a pore size of from 1.8-230 nm and a specific surface area of 20-40 m²/g.

In another embodiment, a method of applying the hierarchical porous $ZrO_2$ prepared in accordance with the method of the present invention includes: providing the hierarchical porous $ZrO_2$; mixing the hierarchical porous $ZrO_2$ with a solution containing a lysozyme protein; and absorbing the lysozyme protein to the hierarchical porous $ZrO_2$.

Compared with conventional technology, the present invention has the following advantages.

1) A triblock copolymer is used with a tannin extract. The triblock servers as a template for forming a mesoporous structure and maintains the ordered pore structure. The tannin extract controls the rate of hydrolysis of the metal salt and forms a macro-porous structure.

2) The present invention uses zirconium sulfate as the metal precursor, and avoids the problems of high price and high toxicity associated with zirconium organic alkoxide and zirconium oxychloride. A hierarchical porous $ZrO_2$ material is prepared under mild, green, and pollution-free synesthetic conditions.

3) The hierarchical porous $ZrO_2$ material prepared in the present invention has a pore diameter ranging from 1.8 to 230 nm and a specific surface area of 20 to 40 m²/g. The obtained hierarchical porous $ZrO_2$ material has good adsorption performance to lysozyme biomacromolecules, and the adsorption capacity for lysozyme is as high as 27.3 mg/g.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings.

Example 1

A method for preparing a hierarchical porous $ZrO_2$ material 1.00 g of triblock copolymer Pluronic P123 was dissolved in 20 mL ethanol solution. 0.78 g of sulfonated *Acacia mangim* tannin extract was dissolved in 30 mL distilled water. The P123 solution and the tannin extract solution was mixed and stirred under air for 20 minutes. 4.29 g of zirconium sulfate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Figure 1:
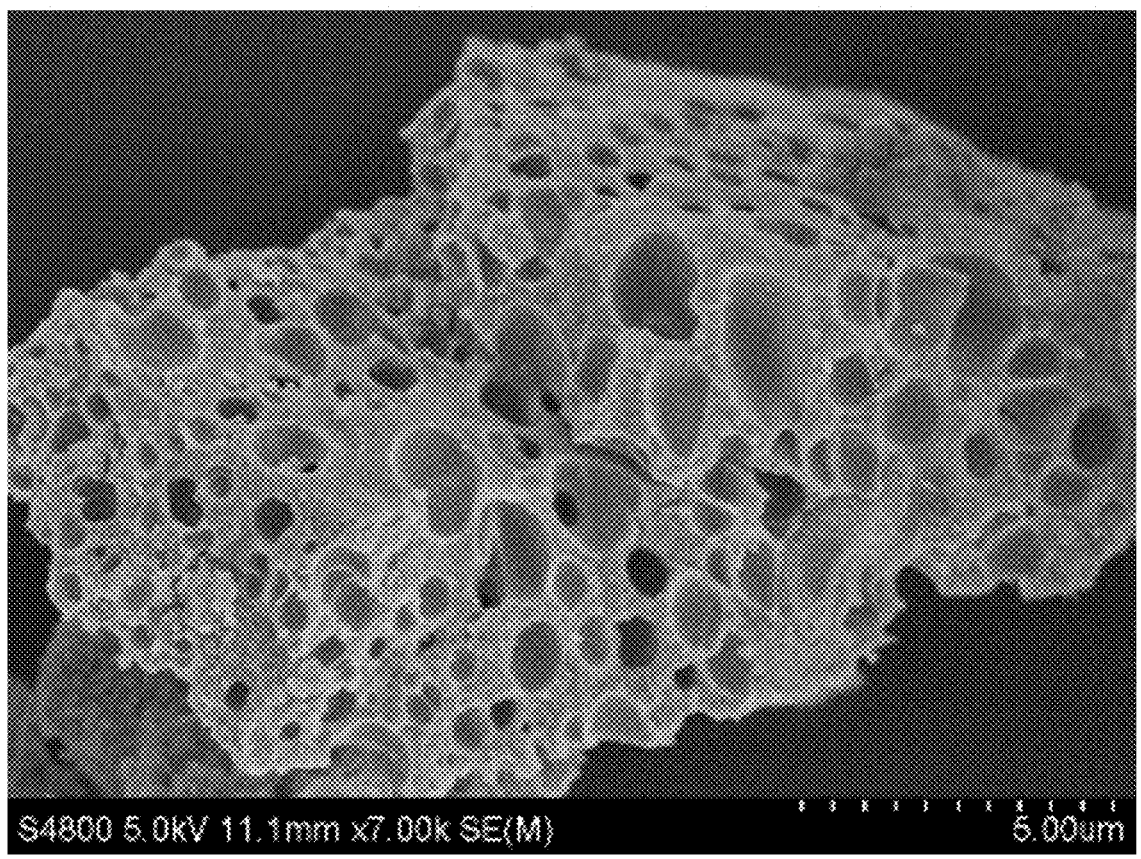
FIG. 1 is an SEM spectrum of the hierarchical porous $ZrO_2$ of Example 1.
Figure 2:
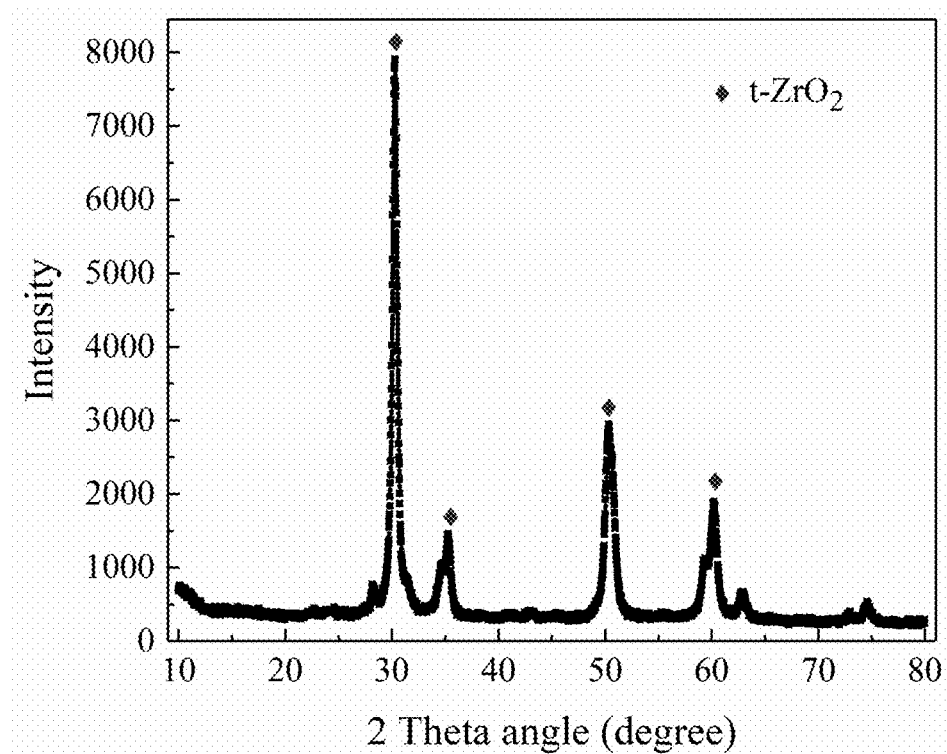
FIG. 2 is a small angle XRD spectrum of the hierarchical porous $ZrO_2$ of Example 1.

The SEM spectrum of the hierarchical porous $ZrO_2$ material is shown in FIG. 1. As shown in FIG. 1, the $ZrO_2$ material has a hierarchical porous structure with both large pores and mesopores. The pore distribution is relatively uniform. Under the action of triblock copolymer and tannin extract, mesoporous or macro-porous structure is formed by "micelle" action. The hydrolysis rate of metal salt (as a stabilizer) is controlled to maintain the pore structure. The small-angle XRD spectrum of the hierarchical porous $ZrO_2$ is show in FIG. 2. As shown in FIG. 2, diffraction peaks are at 2θ=30.2°, 34.9°, 50.2° and 58.9°, indicating tetragonal phase $ZrO_2$. In addition, the sharp and obvious diffraction peak at 2θ=30.2° indicates that the hierarchical porous $ZrO_2$ has high crystallinity.

Example 2

1.00 g of triblock copolymer P123 was dissolved in 20 mL ethanol solution. 1.93 g of sulfonated *Acacia mangim* tannin extract was dissolved in 30 mL distilled water. The P123 solution and the tannin extract solution was mixed and stirred under air for 20 minutes. 4.29 g of zirconium sulfate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Figure 3:
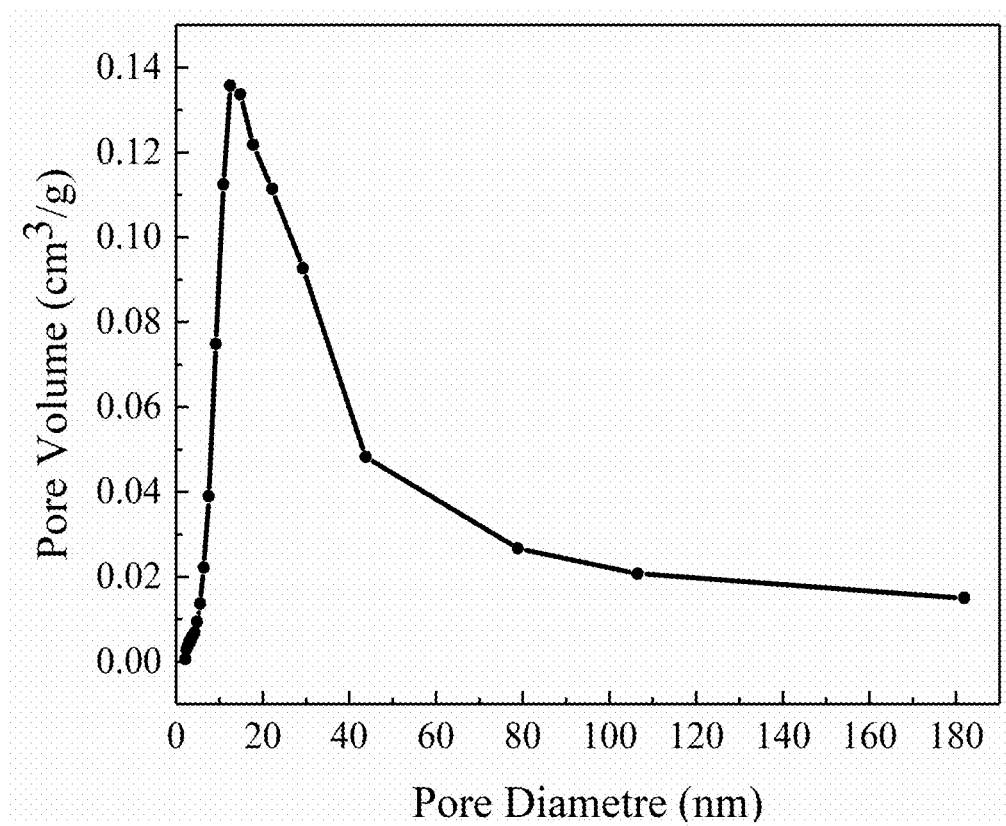
FIG. 3 is a pore size distribution diagram of the hierarchical porous $ZrO_2$ of Example 2.

The pore size distribution of the hierarchical porous $ZrO_2$ is shown in FIG. 3. As shown in FIG. 3, the hierarchical porous $ZrO_2$ material has a wide range of pore distribution (2 to 180 nm). The size is mainly concentrated at 20 nm.

Example 3

1.00 g of triblock copolymer P123 was dissolved in 20 mL ethanol solution. 1.94 g of sulfonated *Acacia mangim* tannin extract was dissolved in 30 mL distilled water. The P123 solution and the tannin extract solution was mixed and stirred under air for 20 minutes. 6.12 g of zirconium sulfate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Figure 4:
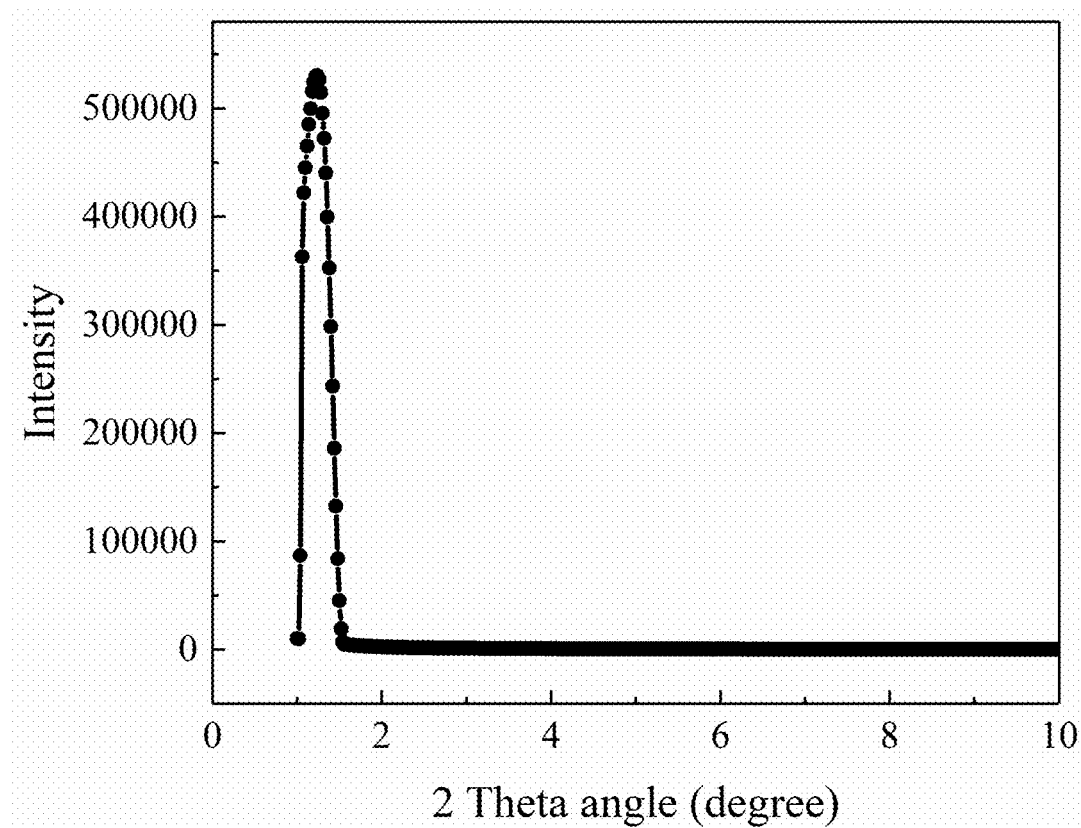
FIG. 4 is an XRD spectrum of the hierarchical porous $ZrO_2$ of Example 3.

The XRD spectrum of the hierarchical porous $ZrO_2$ is shown in FIG. 4. As shown in FIG. 4, the hierarchical porous $ZrO_2$ has a sharp diffraction peak at 2θ=1.3°, which is typical of a mesoporous material. The diffraction peaks indicate the existence of mesoporous structure in the hierarchical porous $ZrO_2$.

Example 4

1.00 g of triblock copolymer P123 was dissolved in 20 mL ethanol solution. 0.78 g of sulfonated *Acacia mangim* tannin extract was dissolved in 30 mL distilled water. The P123 solution and the tannin extract solution was mixed and stirred under air for 20 minutes. 0.61 g of zirconium sulfate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Example 5

1.00 g of triblock copolymer P123 was dissolved in 20 mL ethanol solution. 0.39 g of sulfonated *Acacia mangim* tannin extract was dissolved in 30 mL distilled water. The P123 solution and the tannin extract solution was mixed and stirred under air for 20 minutes. 4.29 g of zirconium sulfate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Example 6

1.00 g of triblock copolymer P123 was dissolved in 20 mL ethanol solution. 1.16 g of sulfonated *Acacia mangim* tannin extract was dissolved in 30 mL distilled water. The P123 solution and the tannin extract solution was mixed and stirred under air for 20 minutes. 4.29 g of zirconium sulfate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Example 7

1.00 g of triblock copolymer P123 was dissolved in 20 mL ethanol solution. 1.55 g of sulfonated *Acacia mangim* tannin extract was dissolved in 30 mL distilled water. The P123 solution and the tannin extract solution was mixed and stirred under air for 20 minutes. 4.29 g of zirconium sulfate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Example 8

1.00 g of triblock copolymer Pluronic F127 was dissolved in 20 mL ethanol solution. 1.79 g of sulfonated *Acacia mangim* tannin extract was dissolved in 30 mL distilled water. The F127 solution and the tannin extract solution was mixed and stirred under air for 20 minutes. 2.59 g of zirconium chloride was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Example 9

1.00 g of triblock copolymer Pluronic F108 was dissolved in 20 mL ethanol solution. 1.95 g of sulfonated *Acacia mangim* tannin extract was dissolved in 30 mL distilled water. The F108 solution and the tannin extract solution was mixed and stirred under air for 20 minutes. 3.43 g of zirconium phosphate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

Example 10

1.00 g of triblock copolymer P123 was dissolved in 20 mL ethanol solution. 0.78 g of sulfonated *Acacia mangim* tannin extract was dissolved in 30 mL distilled water. The P123 solution and the tannin extract solution was mixed and stirred under air for 20 minutes. 2.22 g of zirconium oxalate was added to the mixed solution, and mixed solution was stirred for 3 hours. The solution was then transferred to a culture dish, placed in an oven at 40° C. for 96 hours for aging until the solution was dried, promoting the conversion of the $ZrO_2$ crystal form. The resulted $ZrO_2$ material was transferred to a corundum crucible and was calcined at a high temperature in a muffle furnace, 250° C. for 100 minutes, then 650° C. for 240 minutes, to obtain a white powdery hierarchical porous $ZrO_2$ material.

It should be noted that, SEM spectra, wide-angle XRD patterns, pore size distribution maps and small-angle XRD patterns on the hierarchical porous $ZrO_2$ of Examples 1-10 were taken. The results show that the $ZrO_2$ samples have a relatively regular mesostructure, and the mesoporous pore size is concentrated around 20 nm. The existence of mesostructures can effectively maintain the stability of the framework structure and facilitate the transport of matter. In addition, the $ZrO_2$ material also has large pores. The existence of this structure is of great significance for the adsorption of large-sized protein molecules. A series of structural characterization indicates that the method of the present invention can successfully prepare a $ZrO_2$ material having a hierarchical porous structure.

In addition, lysozyme adsorption experiments on the hierarchical porous $ZrO_2$ material was also conducted.

1) The lysozyme adsorption experiments were carried out on the hierarchical porous $ZrO_2$ material synthesized in the Examples 1-4 of the present invention, and the results are as follows:

0.2 g of the hierarchical porous $ZrO_2$ material of Example 1 was placed in 20 mL of 500 μg/mL lysozyme for 4 hours, and the adsorption capacity of lysozyme was 17.3 mg/g.

0.2 g of the hierarchical porous $ZrO_2$ material of Example 2 was placed in 20 mL of 500 μg/mL lysozyme for 4 hours, and the adsorption capacity of lysozyme was 14.4 mg/g.

0.3 g of the hierarchical porous $ZrO_2$ material of Example 3 was placed in 20 mL of 500 μg/mL lysozyme for 4 hours, and the adsorption capacity of lysozyme was 27.3 mg/g.

0.18 g of the hierarchical porous $ZrO_2$ material of Example 4 was placed in 18 mL of 500 μg/mL lysozyme for 4 hours, and the adsorption capacity of lysozyme was 14.5 mg/g.

2) Lysozyme adsorption experiments on hierarchical porous $ZrO_2$ materials prepared with different tannin extract contents were also conducted.

In Examples 1, 2, 5, 6, and 7, the amounts of sulfonated *Acacia mangim* tannin extract are 0.02 mol (0.78 g), 0.05 mol (1.93 g), 0.01 mol (0.39 g), 0.03 mol (1.16 g), and 0.04 mol (1.55 g), respectively.

Figure 5:
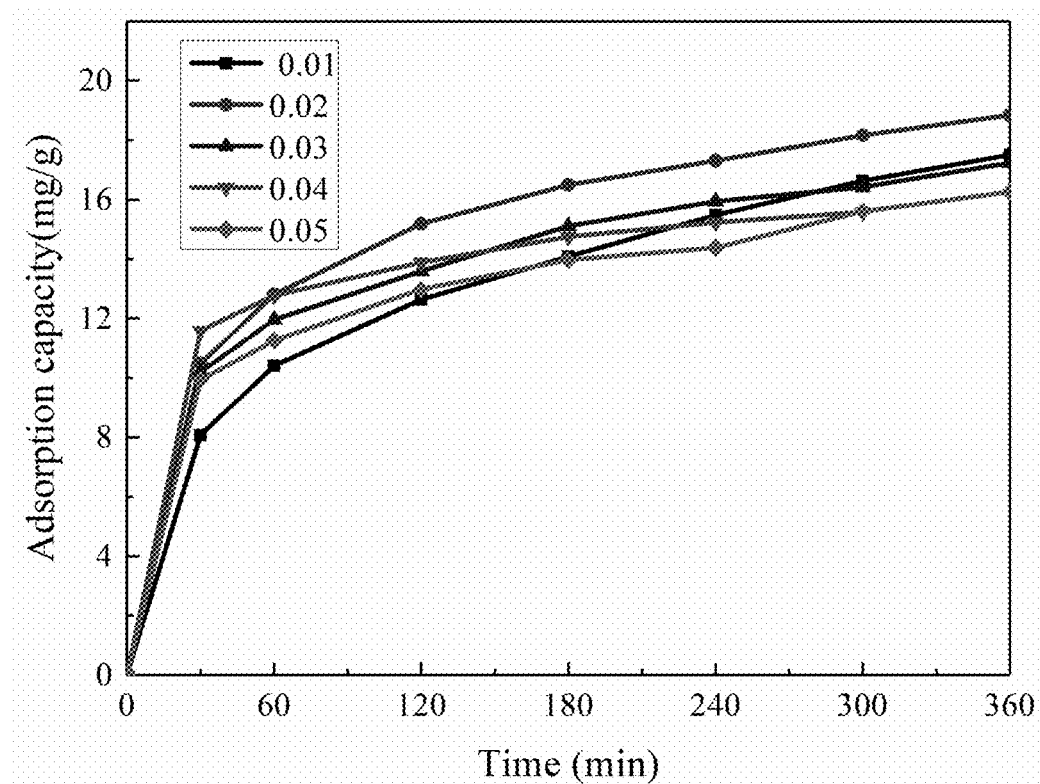
FIG. 5 is a graph showing the adsorption effect of the hierarchical porous $ZrO_2$ materials prepared with different amounts of tannin extract on lysozyme.

0.7 g of each hierarchical porous $ZrO_2$ material was placed in 70 mL 500 μg/mL lysozyme. A 10 mL solution was taken at 30 min, 1 h, 2 h, 3 h, 4 h, 5, and 6 h. The solutions were centrifuged at 5000 r/min for 5 min, and the supernatant was taken and measured at 280 nm for absorbance. The adsorption effect of hierarchical porous $ZrO_2$ prepared with different tannin extract contents on lysozyme is shown in FIG. 5. As shown in FIG. 5, with the increase of the amount of tannin extract, the adsorption capacity first increased and then decreased. When the amount of tannin extract is 0.02 mol (0.78 g), the hierarchical porous $ZrO_2$ has the best adsorption performance on lysozyme.

It should be noted that the triblock copolymer is preferably Pluronic P123, Pluronic F127, or Pluronic F108. The tannin extract is preferably sulfonated *Acacia mangim* tannin extract. The metal salt is preferably zirconium chloride, zirconium sulfate, zirconium nitrate, zirconium phosphate, or zirconium oxalate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for preparing a hierarchical porous $ZrO_2$ comprising the following steps:
   S1, dissolving a triblock copolymer in an organic solvent to obtain a solution A, dissolving a tannin extract in distilled water to obtain a solution B, mixing the solution A and the solution B and stirring to obtain a mixed solution;
   S2, adding a zirconium salt to the mixed solution obtained in step S1 and stirring;
   S3, heating the mixed solution obtained in step S2 in an oven to obtain $ZrO_2$, promoting the conversion of the crystal form of $ZrO_2$; and
   S4, calcining $ZrO_2$ at a high temperature to obtain the hierarchical porous $ZrO_2$.

2. The method of claim 1, wherein the triblock copolymer is Pluronic P123, Pluronic F127 or Pluronic F108.

3. The method of claim 1, wherein the tannin extract is a sulfonated *Acacia mangim* tannin extract.

4. The method of claim 1, wherein the zirconium salt is zirconium chloride, zirconium sulfate, zirconium nitrate, zirconium phosphate, or zirconium oxalate.

5. The method of claim 1, wherein the organic solvent is methanol, ethanol, ethylene glycol, or glycerin.

6. The method of claim 1, wherein a molar ratio of the triblock copolymer:the tannin extract:the zirconium salt is 0.015-0.05:0.01-0.05:0.1-1.0.

7. The method of claim 1, wherein in step S2, the mixed solution is stirred for 3-6 hours; in step 3, the mixed solution is heated at 40° C. for 24-96 hours; and in step S4, $ZrO_2$ is calcined at 200-250° C. for 60-120 minutes and then at 550-700° C. for 240-360 minutes.

* * * * *